Figure 1:
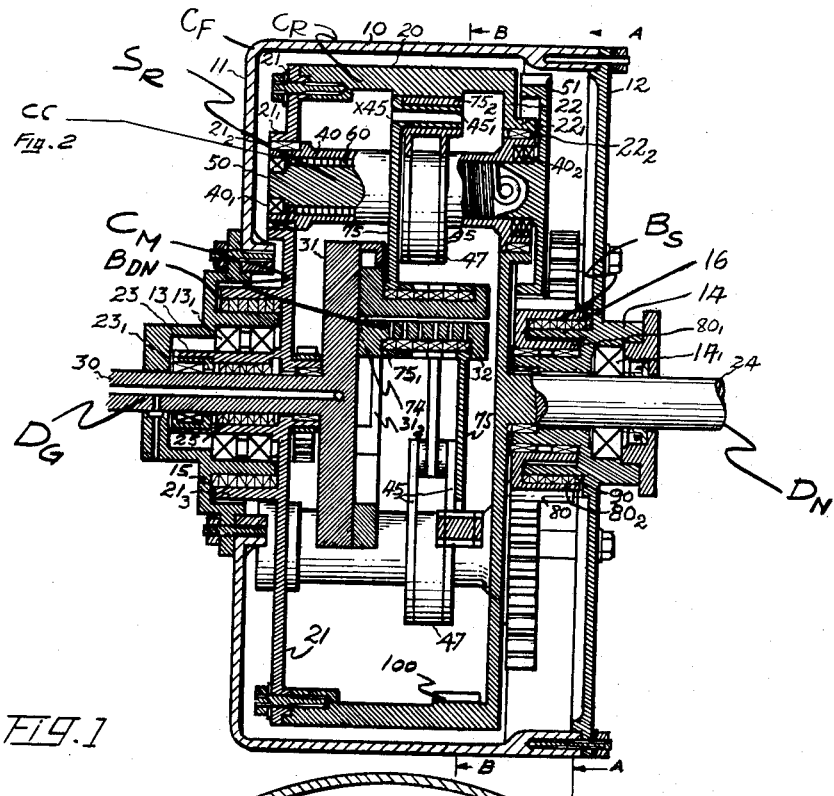

Dec. 19, 1961 J. F. G. M. L. CHARPENTIER 3,013,446
WHOLLY MECHANICAL, AUTOMATIC, CONTINUOUS, AND SUBSTANTIALLY
FRICTIONLESS CONVERTERS OF ROTATIONAL MOTION
Filed Oct. 8, 1958 15 Sheets-Sheet 1

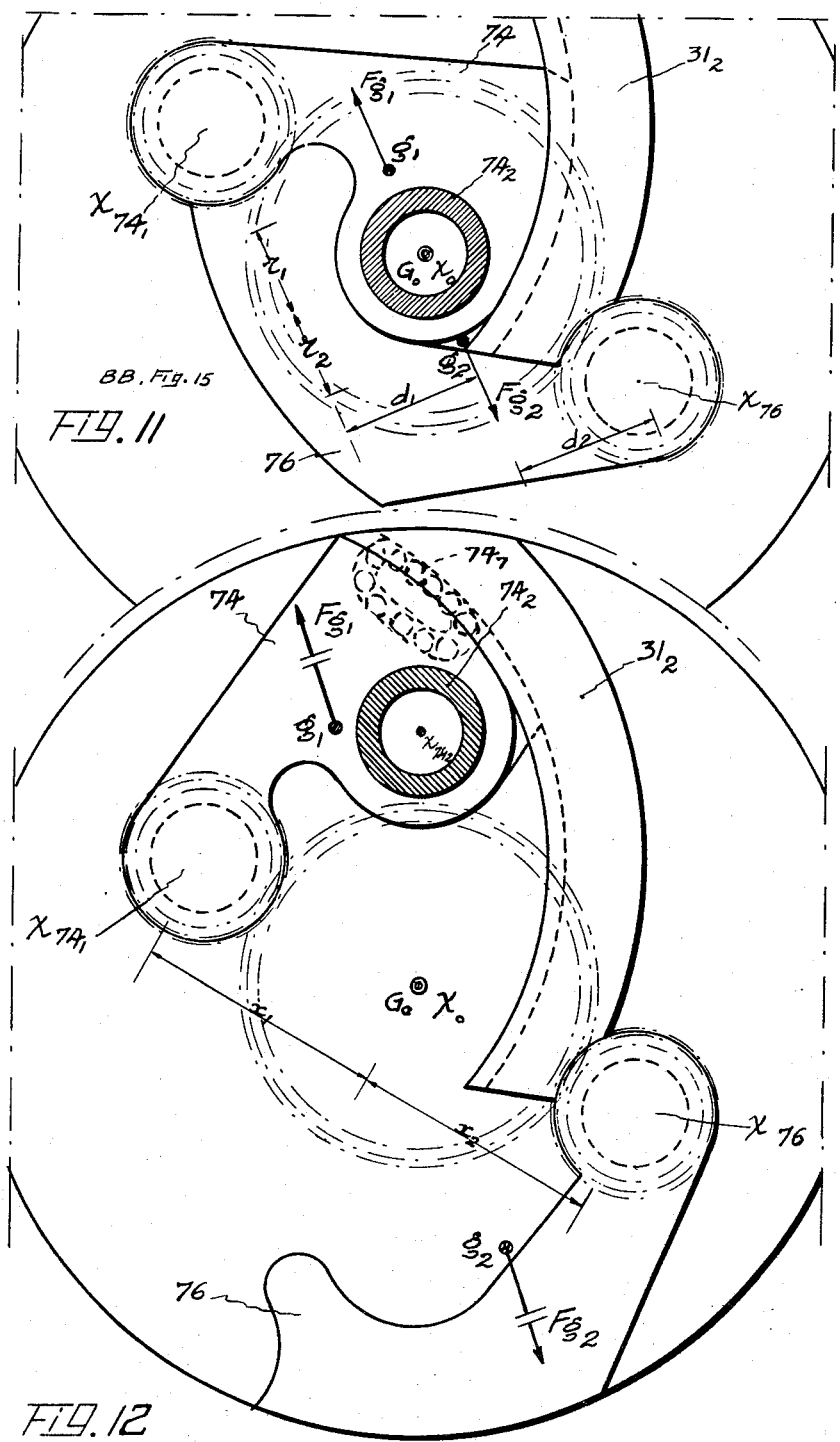

Caracteristics Common To The Two Systems of Springs

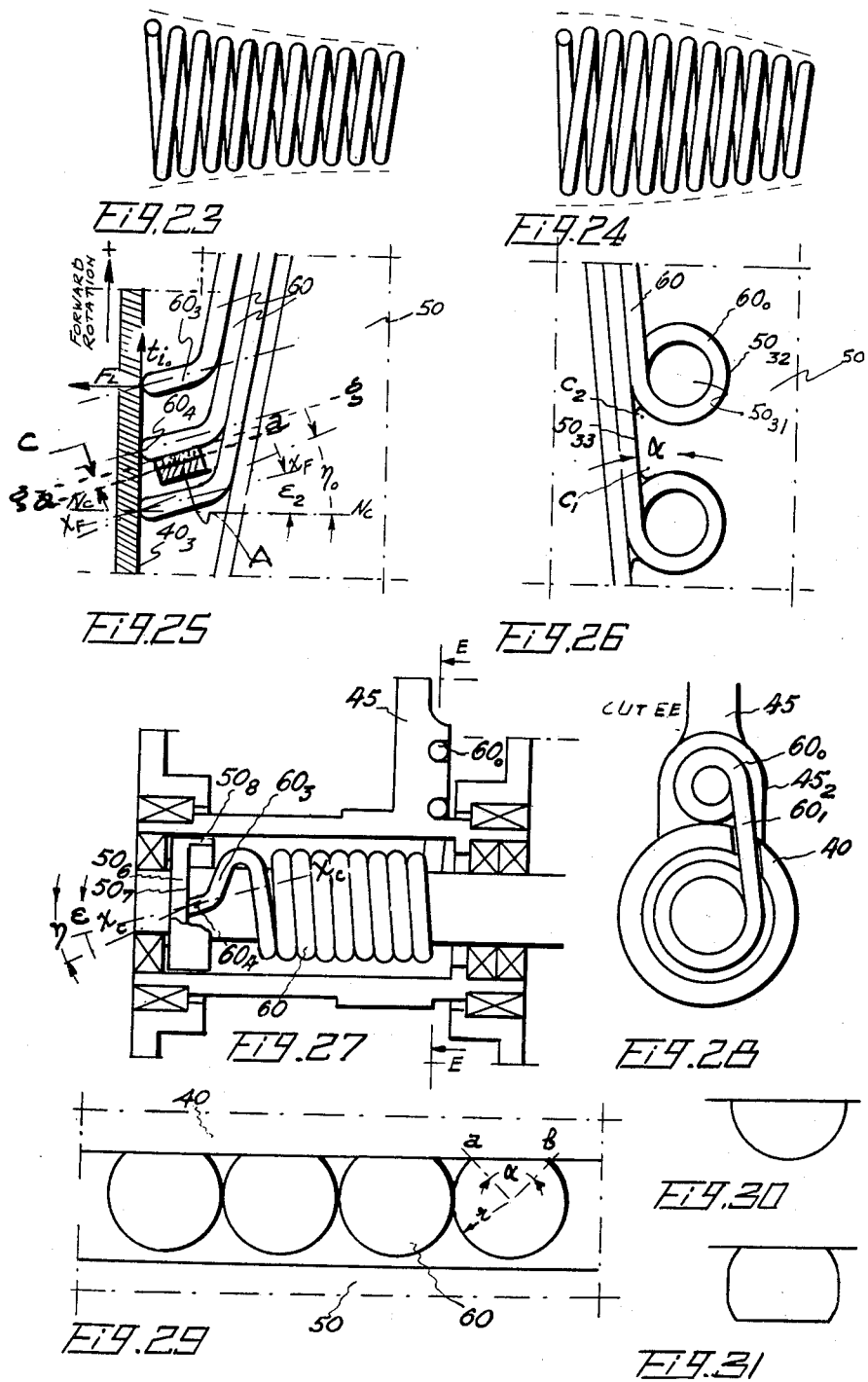

United States Patent Office 3,013,446
Patented Dec. 19, 1961

3,013,446
WHOLLY MECHANICAL, AUTOMATIC, CONTINUOUS, AND SUBSTANTIALLY FRICTIONLESS CONVERTERS OF ROTATIONAL MOTION
Jean F. G. M. L. Charpentier, 254 N. Highland Akron 3, Ohio
Filed Oct. 8, 1958, Ser. No. 817,700
10 Claims. (Cl. 74—752)

This invention relates to rotary motion converters or transmissions which are automatically responsive to torque and speed, and capable of use, for example, as an automatic transmission for a motor vehicle.

The object of this invention is to provide a new type of converter of motion, which is wholly mechanical and able to automatically achieve the continuity of the transmission of motion from an engine to a resistance in an integral process, i.e. independently of the variation of the power provided from the engine as well as of the difference of magnitude which can arise from any one of the opposed driving and resisting torques or forces. Such an achievement is permanently maintained by an efficiency the coefficient of which remains close or equal to unity within the full operating range.

The operation, which consists of a progressive, simultaneous and continuous adaptation to the required magnitude of all the variables included in the mechanical power equation, is controlled by only the differential effect due to the opposed driving and resisting forces applied on the converting mechanism, and their combination with the natural intrinsic forces generated on the components of said converting mechanism as the consequence of the motion itself. In a general manner the converters are able to perform the following operations:

(1) To engage an engine against a resistance as soon as the power provided by the engine reaches a predetermined value, (2) To permanently maintain, after said engagement is achieved, a steady state of equilibrium between the absolute values of the converted driving force and the opposed resisting force, both applied on the driven member, while adapting at the corresponding value the angular speed ratio of the driving and driven members, (3) To lock together the components of the converting mechanism, for connecting both the engine and resistance in direct drive as soon as the specific required conditions are satisfied, (4) To achieve under an imperceptible manner said self-locking operation, by providing the parameters of the final speed ratio device, implied in the link of the partial ratios whose total product determines the angular speed ratio between the driving and driven members, with such an adequate predetermined value that said self-locking operation as described above, can only be performed when the rotational speed transmitted to the driven member through the converting mechanism, becomes equal to the proper rotational speed of the driving member, (5) To unlock, under a reciprocal imperceptible manner, the components of the converting mechanism in order to disconnect the driving and driven members and start in operation the converting mechanism chiefly in the two following cases:

(A) When the increasing absolute value of the resisting torque impels the driving torque to reach a predetermined value which is chosen as being properly smaller than that of the maximum torque, specific of the considered curve of torque versus rotation corresponding to any constant value of the parametrical opening angle of thet carburetor's choke-throttle, (B) When a definite increasing rate of the driving torque is abruptly applied on the converting mechanism.

(6) To disengage the engine from the resistance as soon as the power provided by the engine reaches said predetermined value enunciated in paragraph No. 1, (7) To repeat, under a similar manner, the same cycle of operation as described above for every one of the infinite number of the power-curves family that a fuel engine can provide as a function of the infinite number of values taken by the opening angle of the carburetor's choke-throttle, i.e. for an infinity of values of the rate of consumption of energy, and doing so, to satisfy the enunciated "Integral solution to the problem of the automatic stability required from the continuity of the transmission of motion for any magnitude of power provided by an engine, to any increase of the magnitude of the opposed resistance."

(8) To utilize the engine as a braking device when idling by connecting both the driving and driven members, in the case their functions are reversed, as it is the case of a vehicle running down hill. Moreover, said mechanism which in such a case automatically connects driving and driven members for using the engine as a braking device can be neutralized by means of an appropriated hand-control system which enables the motive wheels of a vehicle to freely rotate for recovering the stored kinetic energy due to the motion.

(9) Independently of the scope of the automatic operations as described above, whole or partial component of the converter's mechanism and the fixed casing can be locked by means of a hand-control device, and in doing so, to provide the vehicles with a device known as a "parking-brake"

Figure 2:
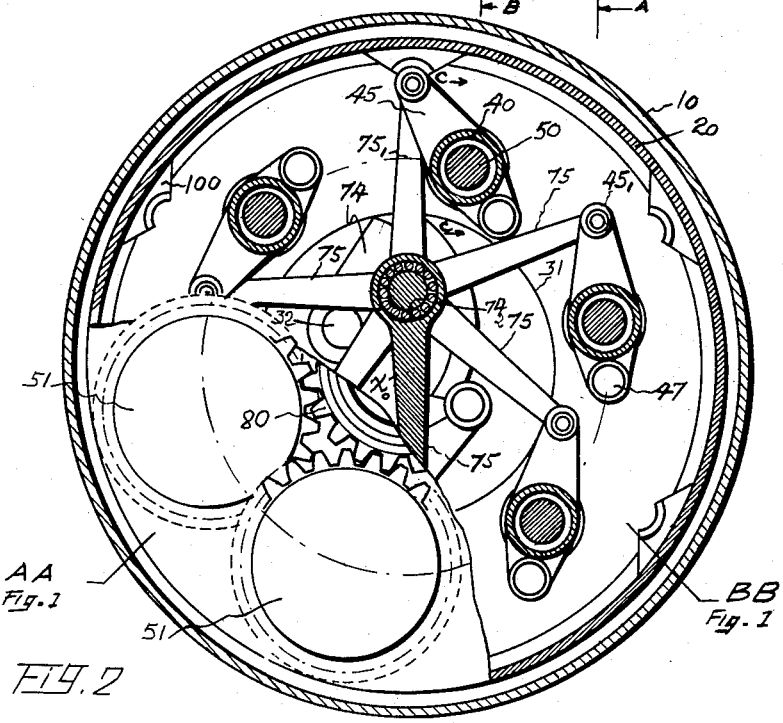
Figures 3, 4:
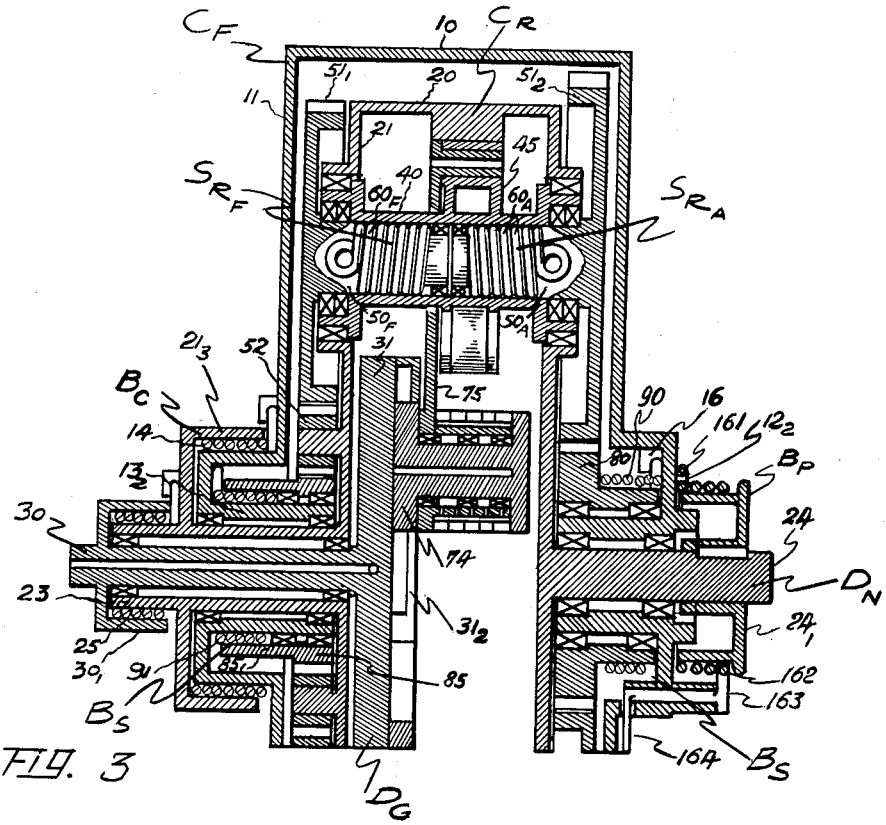
Figure 5:
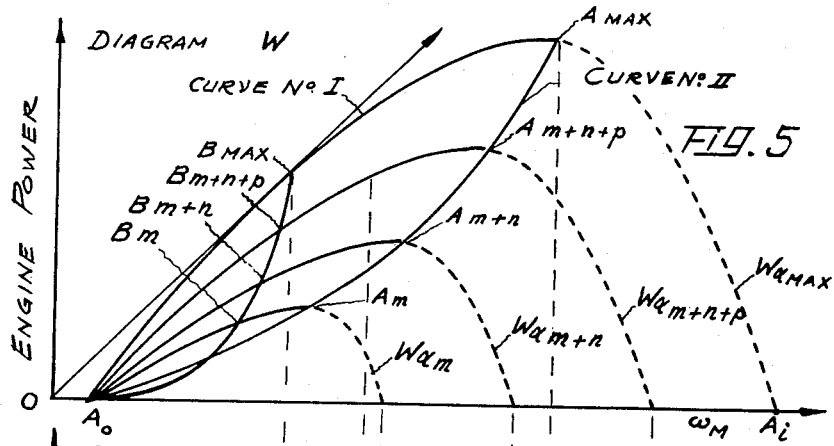
Figure 6:
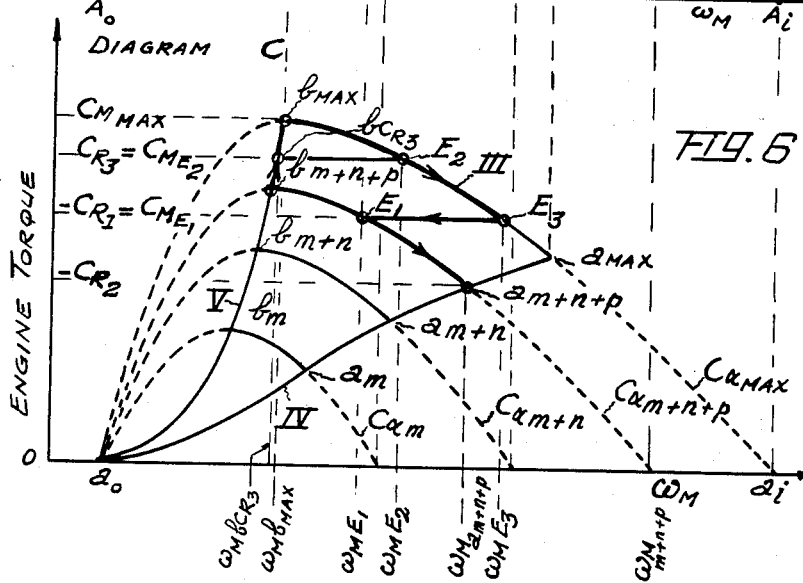
Figure 7:
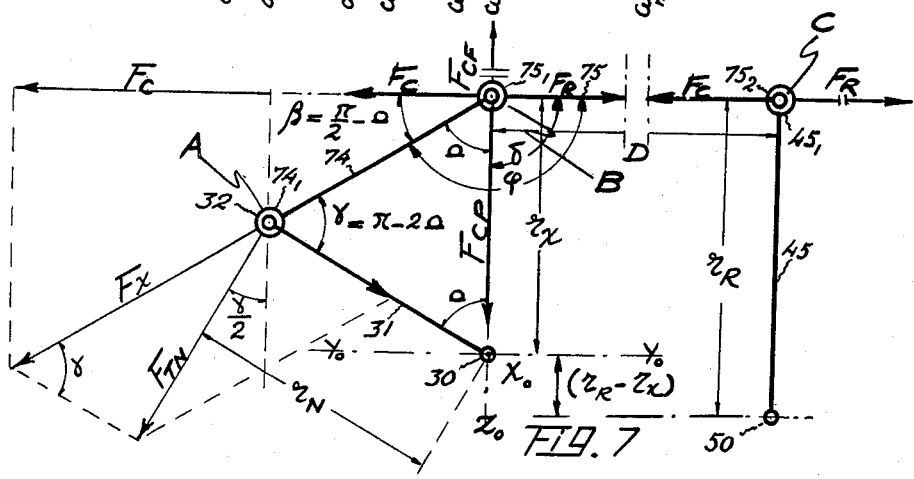
Figure 8:
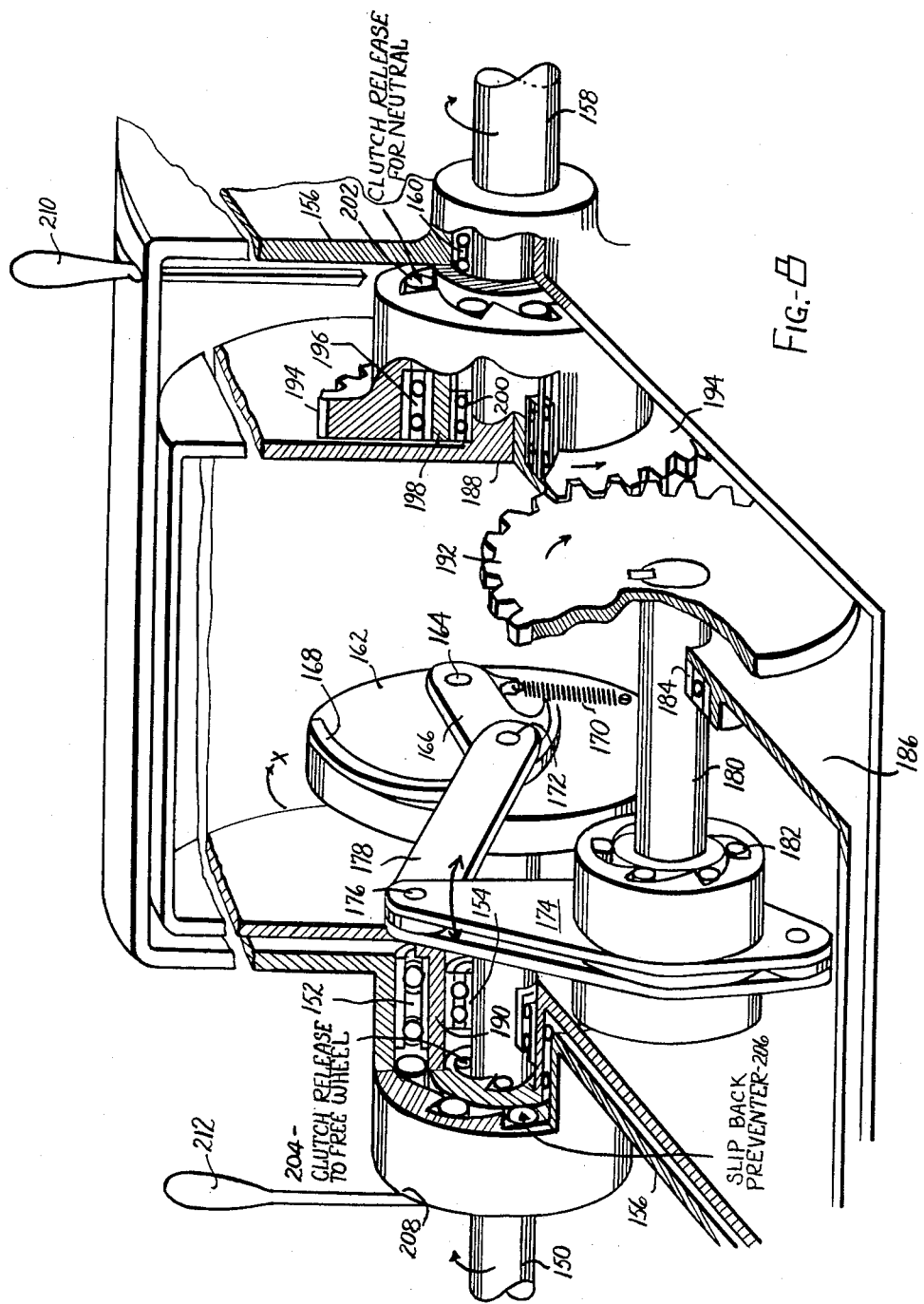
Figure 9:
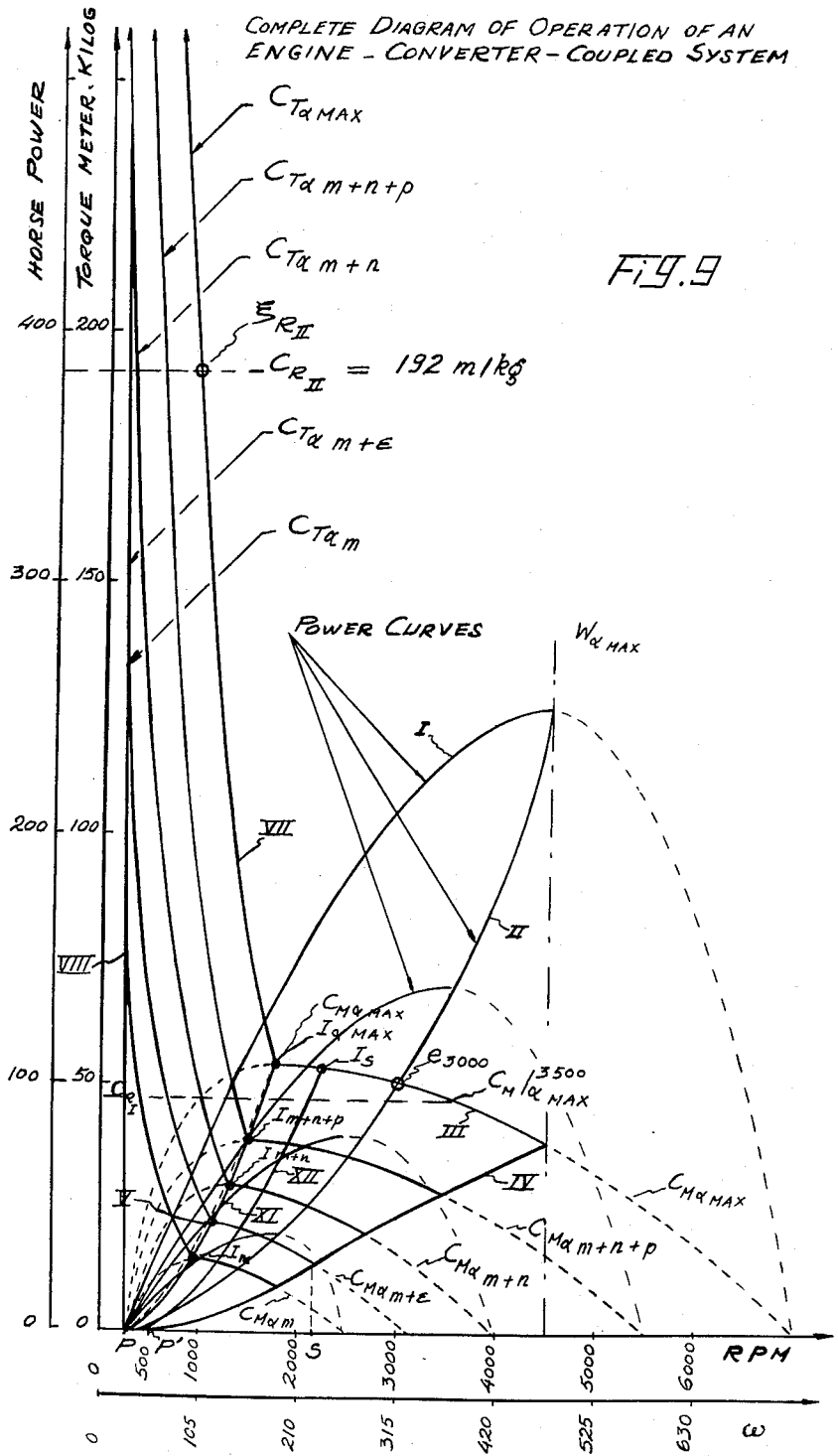
Figure 10:
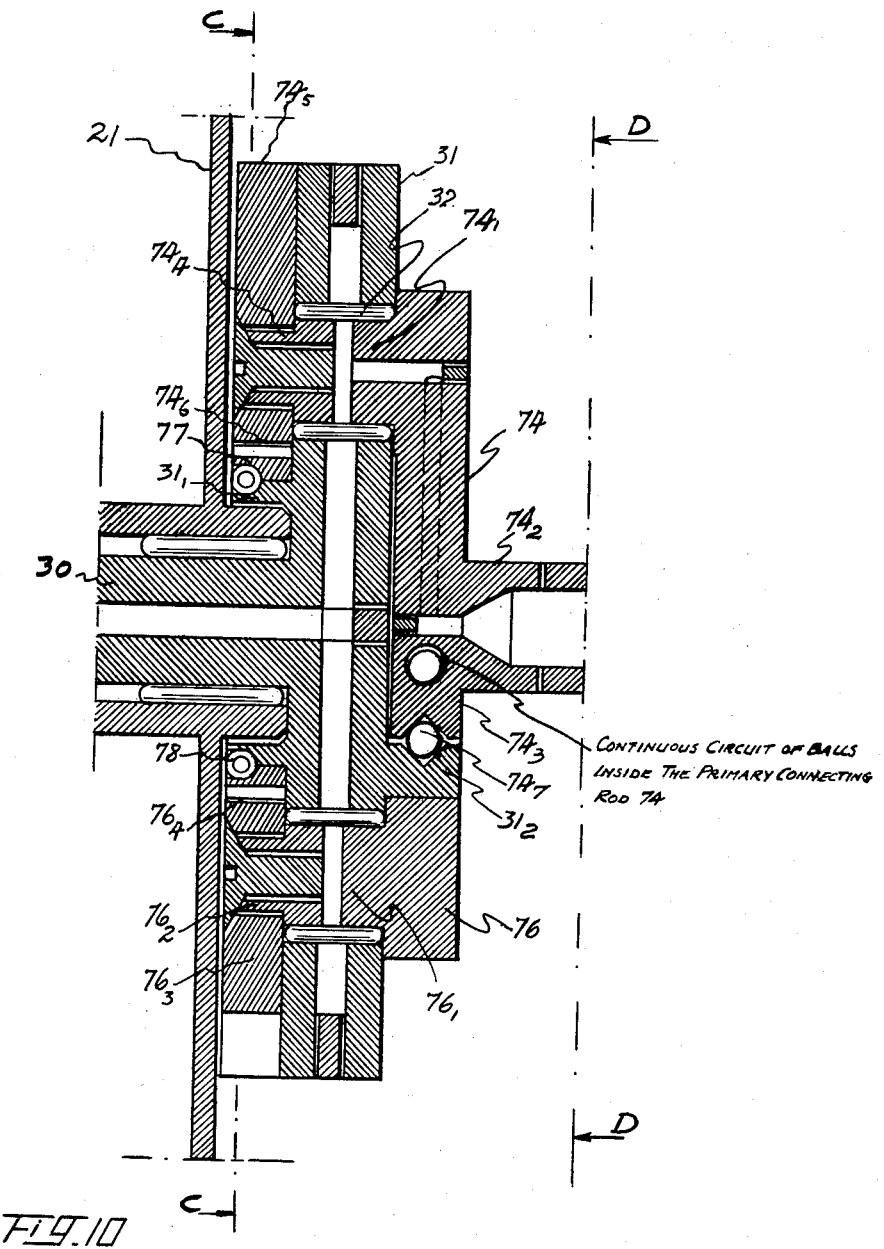
Figure 13:
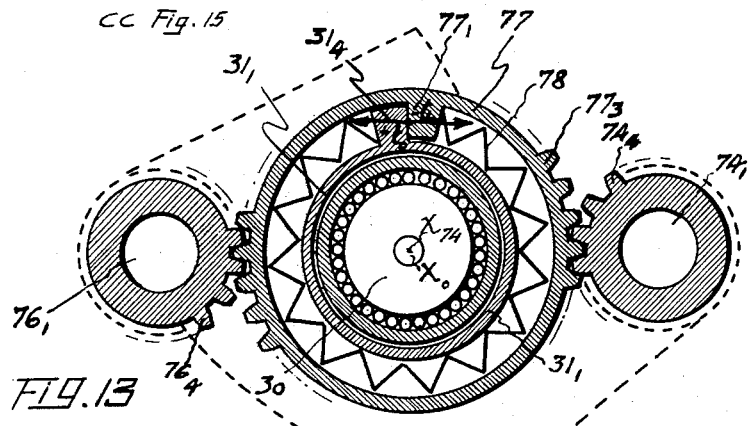
Figure 14:
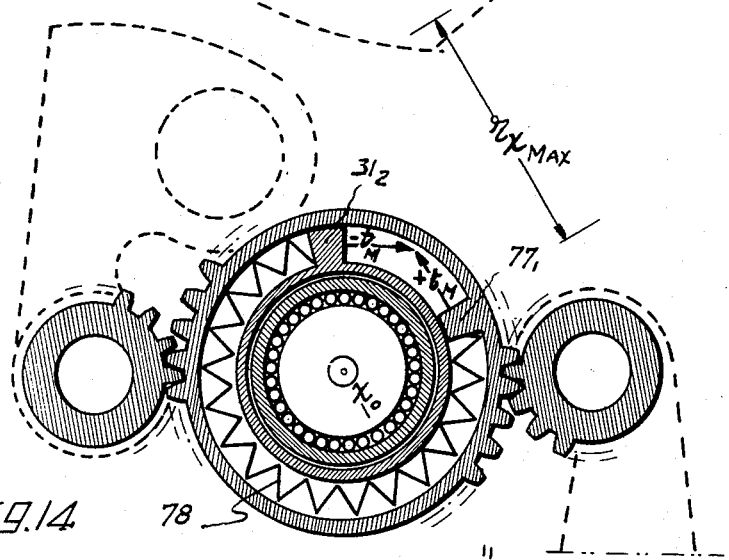
Figure 15:
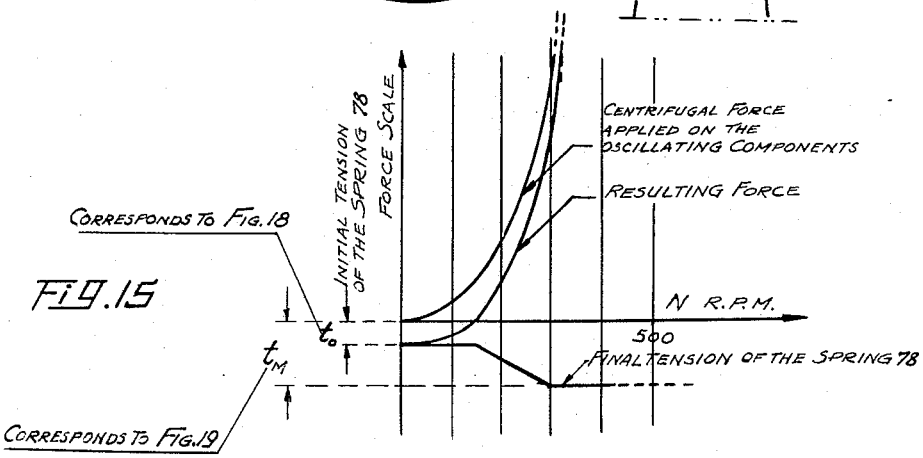
Figure 16:
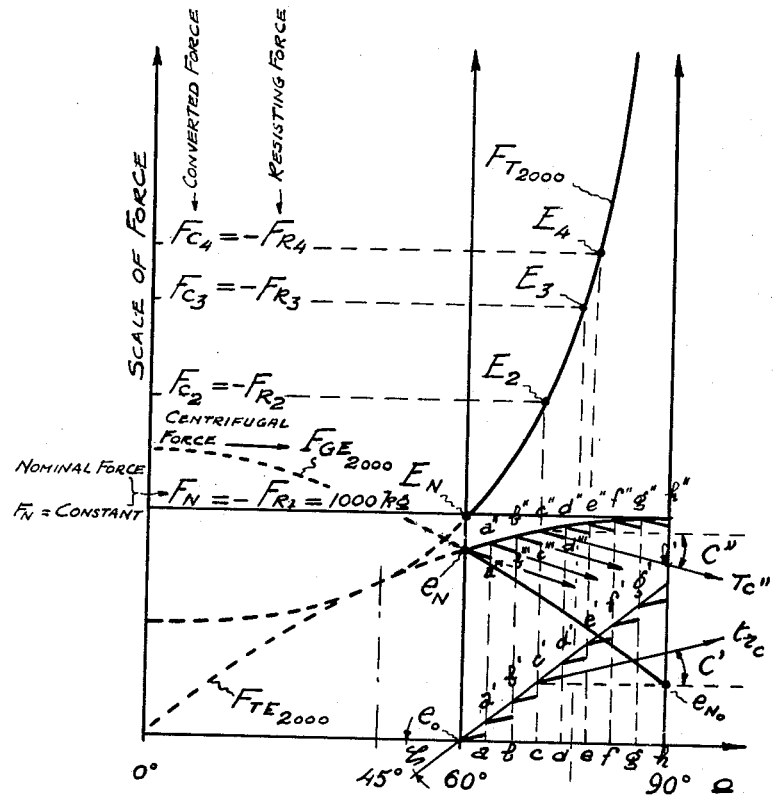
Figure 17:
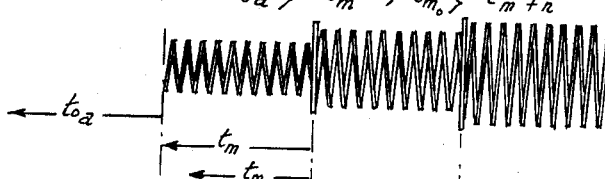
Figure 18:
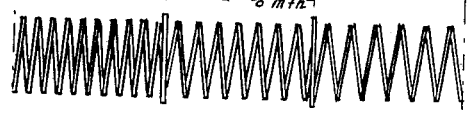
Figure 19:
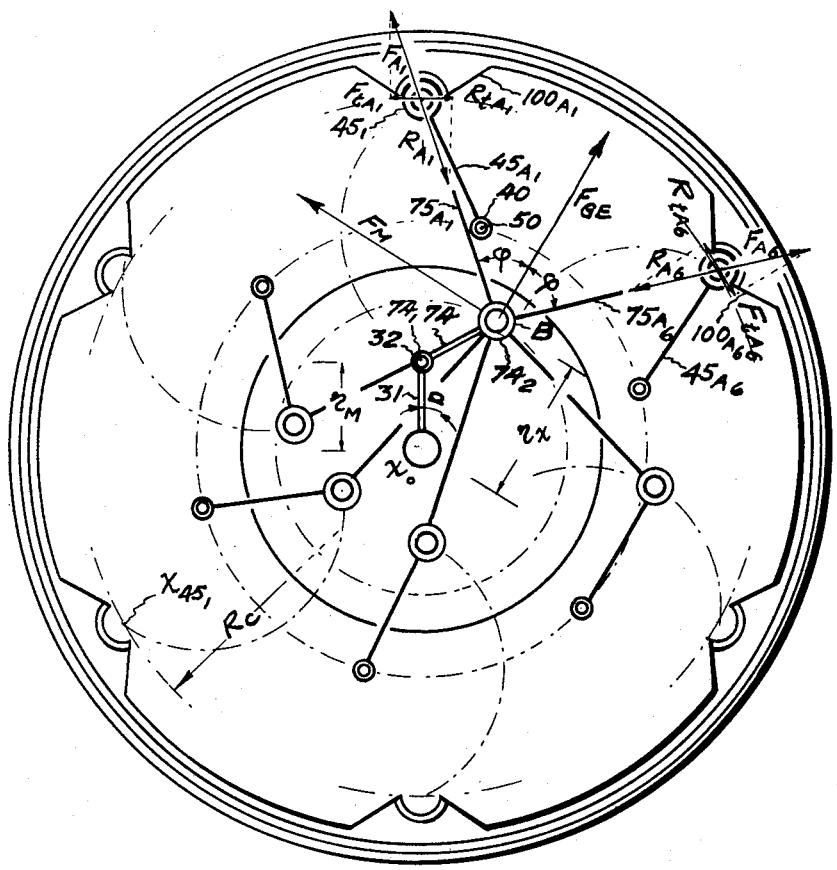
Figure 20:
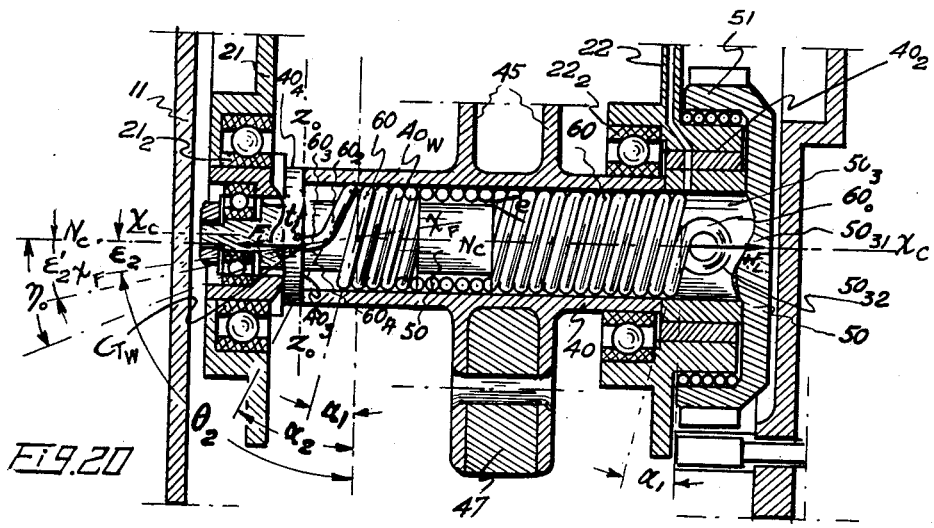
Figure 21:
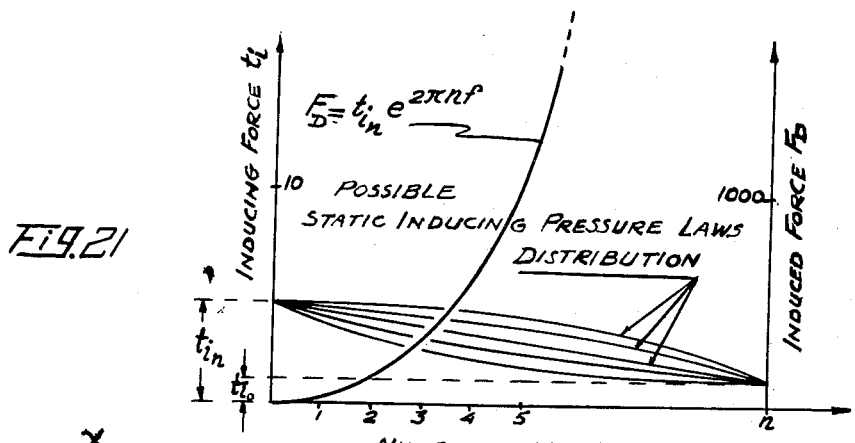
Figure 22:
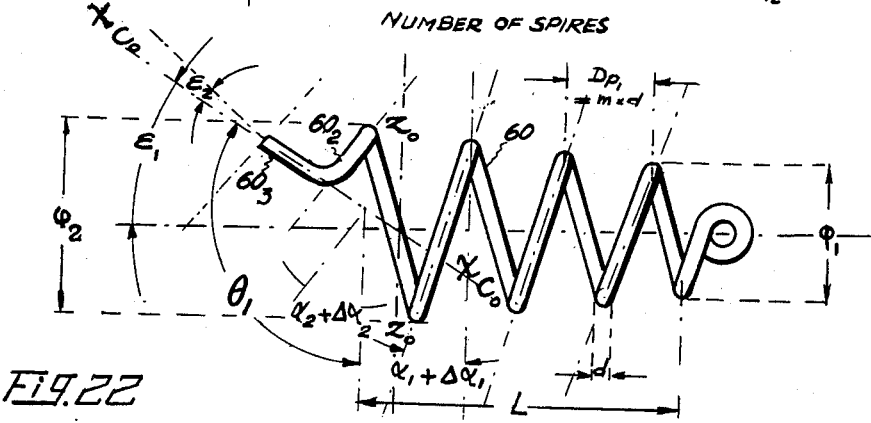
Figure 32:
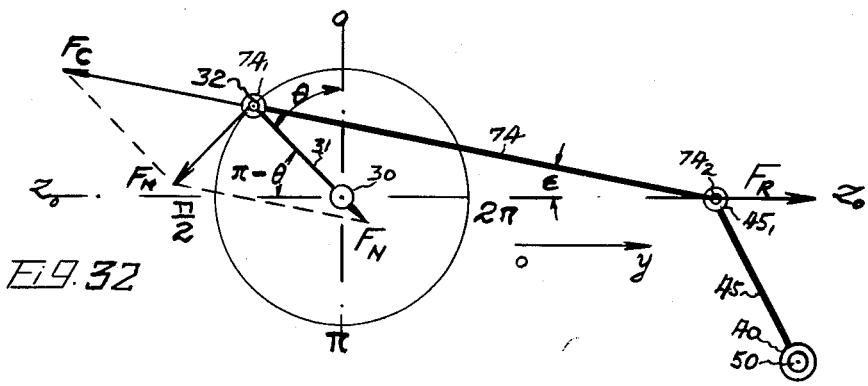
Figure 33:
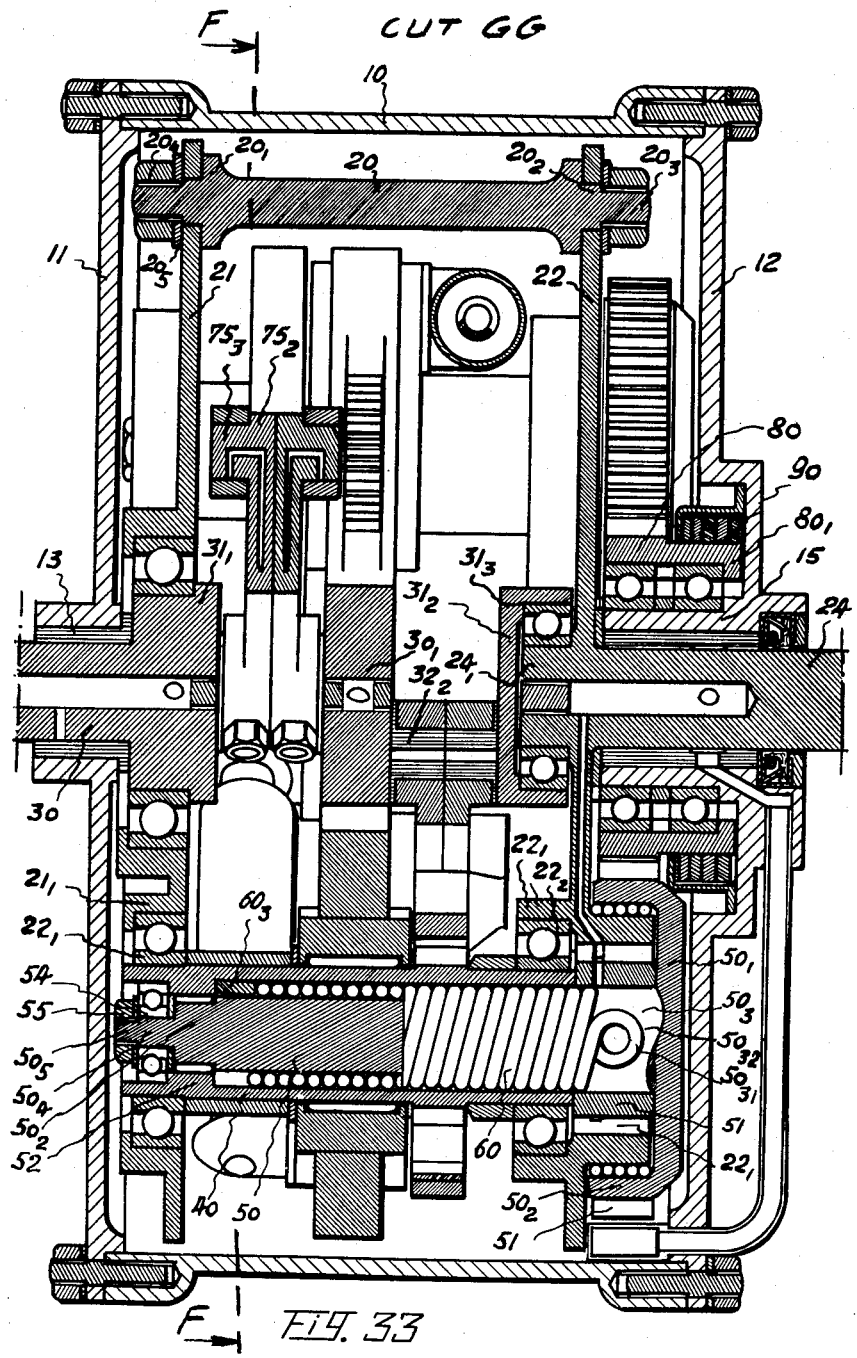
Figure 34:
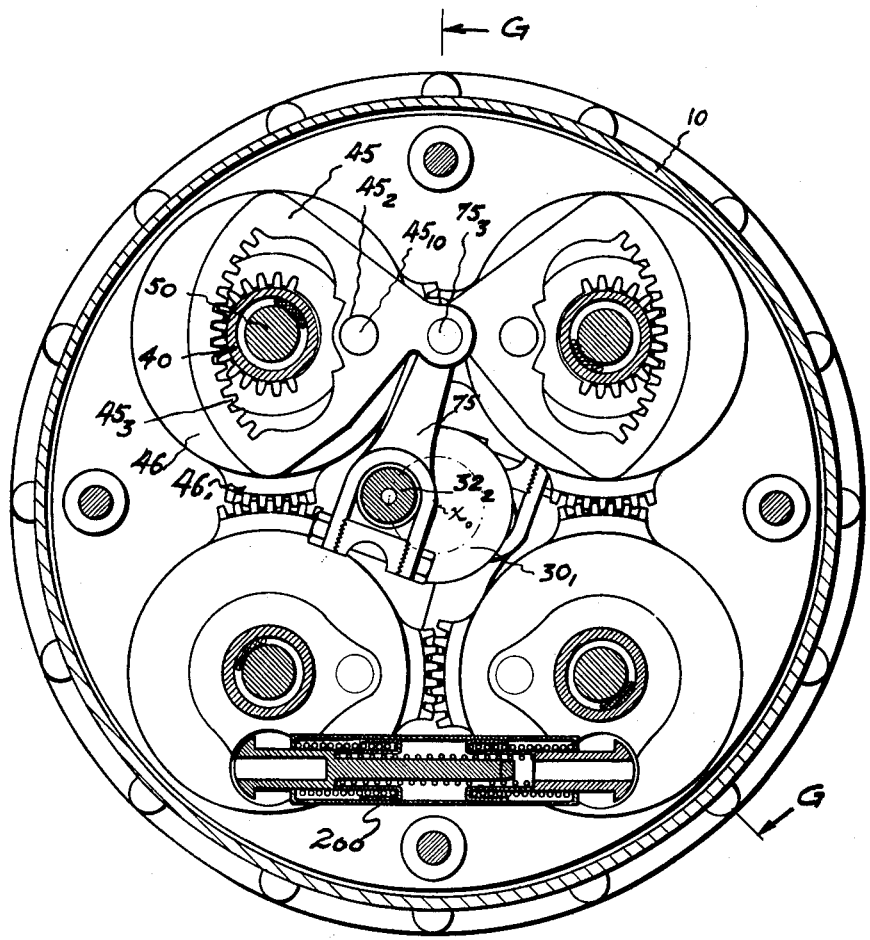

In the drawings, FIG. 1 is a diametric cross-sectional view through a transmission incorporating the principles of the invention; FIG. 2 is a cross-sectional view taken on line B—B of FIG. 1; FIG. 3 is a view similar to a portion of FIG. 1 but of a modification of the invention; FIG. 4 is a diagrammatic showing of the overlapping power strokes of a plurality of rocker arms; FIG. 5 is a series of power curves of an engine at various throttle openings; FIG. 6 is a view like FIG. 5 and showing the torque curves at the same throttle openings; FIG. 7 is a force diagram of the principal components of the mechanism; FIG. 8 is a fragmentary prospective view of a simplified mechanism drawn to explain the operation of the transmission; FIG. 9 illustrates the operating curves of the transmission in conjunction with the engine torque curves; FIG. 10 is an enlarged diametric sectional view of the drive crank and counterbalancing mechanism; FIGS. 11 and 12 are taken on line D—D of FIG. 10 and show the crank and counterbalance in zero and maximum drive position respectively; FIGS. 13 and 14 are taken on line C—C of FIG. 10 and show details of the crank return spring; FIG. 15 shows a curve of forces on the crank and that the spring prevents crank movement until 150 r.p.m. is reached; FIG. 16 is a curve wherein constant r.p.m. input is maintained regardless of load changes; FIGS. 17 and 18 are typical spring combinations which may be used to resist outward centrifugal movement of the crank in order to obtain the curves of FIG. 16; FIG. 19 is a diagrammatic showing similar to FIG. 2, the relative position of the crank, connecting rods and rocker arms as the transmission reaches direct drive; FIG. 20 is a cross-sectional view of the improved overrunning clutch between each rocker arm and its support shaft and showing the counterbalance on the rocker arm; FIG. 21 is a diagram of forces of the clutch of FIG. 20; FIGS. 22, 23 and 24 all show springs which can be utilized in the clutch of FIG. 20; FIG. 25 is an enlarged fragmentary showing of the ends of a plurality of interlaced springs, for example to transmit heavy horsepower; FIG. 26 is a view like FIG. 25 but showing the anchored ends of the interlaced springs; FIG. 27 is a longitudinal sectional view of a modified overrunning spring clutch wherein the spring works in tension (rather than in compression, as in the springs already illustrated); FIG. 28 is a cross-sectional view taken on line A—A of FIG. 27; FIGS. 29, 30 and 31 are enlarged diagrammatic views of cross-sectional spring band shapes which may be employed; FIG. 32 is a force diagram showing the forces existing in a standard crank arm, connecting rod and rocker arm assembly as the crank arm turns into alignment with the connecting rod; and FIGS. 33 and 34 are respective longitudinal and diametric cross-sectional views of a modified form of the invention.

The converter is made of two fundamental units: the first unit provides a chain of motion between the driving and the driven shafts of the transmission mechanism; and the second unit constitutes the automatic controlling or adjusting mechanism. The two fundamental units are present in the two types of converters given as examples hereinafter. Each one of said two fundamental units can be utilized together or separately or in combination with all other devices adaptable to them.

A preliminary understanding of the principles of operation of the invention can be gained from a consideration of the schematic drawing of FIG. 8. In this figure the numeral 150 indicates a driving shaft journalled by bearing rings 152 and 154 in a fixed casing 156. The driving shaft 150 is in alignment with a driven shaft 158 journalled by a bearing ring 160 in the fixed casing 156. Secured to the driving shaft 150 is a disc-like member 162 carrying a pivot pin 164 which is parallel to the driving shaft 150, but with the pivot pin 164 being offset radially from the axis of the driving shaft. The pivot pin 164 pivotally supports a crank arm 166 which swings radially outwardly in a guide track 168 under the action of centrifugal force as the member 162 is rotated by the driving shaft 150, and a spring 170 acts to return the crank arm 166 to its innermost position as the rotary speed of the member 162 drops to a slow or idling speed.

The crank arm 166 carries a crank pin 172 which pin, during the slow or idling speed of movement of the disc member 162 is substantially in alignment with the axis of the driving shaft 150, but which pin moves radially outwardly from the axis of the driving shaft as the crank arm 166 swings outwardly in the track 168 under the action of centrifugal force as the driving shaft 150 is speeded up.

Mounted substantially in the plane of the crank arm 166 is a rocker arm 174 pivotally connected at 176 with a connecting rod 178 which is pivotally connected with the crank pin 172. The rocker arm 174 is mounted upon a shaft 180 (which may be called a planetary shaft because it mounts a planetary gear) by means of an overrunning one-way clutch 182, and the shaft 180 is journalled by a ring bearing 184 in a rotary casing 186 mounted for rotary movement inside the fixed casing 156. The rotary mounting of the rotary casing 186 in the fixed casing is effected by securing the rotary casing to the driven shaft 158 at point 188, and by forming the rotary casing 186 with a hollow trunnion 190 at its other side, the hollow trunnion 190 being carried between bearing rings 152 and 154, and with the driving shaft 150 extending through the trunnion inside of the bearing ring 154 in the manner shown.

The end of the shaft 180 opposite to the rocker arm 174 is secured to a planetary gear 192 which engages with a sun gear 194 rotatably mounted upon a ring bearing 196 carried by a hollow trunnion 198 formed integral with the fixed casing 156, with the trunnion 198 receiving a second ring bearing 200 to additionally support the driven shaft 158. The sun gear 194 is provided with an overrunning one-way clutch 202 which permits the sun gear to rotate in one direction but not the other.

Completing the assembly, an overrunning one-way clutch 204 is provided between the trunnion 190 and the driving shaft 150, and an overrunning one-way clutch 206 is provided between the trunnion 190 and the hollow sleeve 208 formed integral with the fixed casing 156.

In the operation of the apparatus as described with the driving shaft 150 turning in the direction shown by the arrow, but at relatively slow or idling speed, the crank arm 166 remains at its innermost position with crank pin 172 being in alignment with the axis of the driving shaft 150 so that no oscillating movement is given to the rocker arm 174 with the result that no rotary motion is transmitted to the driven shaft 158.

Assume now that forward motion or drive through the transmission is desired and the operator opens the throttle of the engine driving the driving shaft 150. At this time the rotary movement of disc member 162 speeds up and crank arm 166 is thrown out centrifugally to move crankpin 172 into a position radially offset from the axis of the driving shaft 150. Then with crank arm 166 acting as a crank through connecting rod 178 rocker arm 174 is oscillated back and forth, the extent of oscillation, i.e. the total arcuate distance moved being a direct function of the distance that the crank arm 166 has moved out centrifugally. The oscillating movement of rocker arm 174 is converted to intermittent rotary movement of shaft 180 and planetary gear 192 in the direction of the arrow shown on the gear by means of the one-way clutch 182. Planetary gear 192 turning in the direction of the arrow attempts to turn the sun gear 194 in the direction of the arrow shown on it, but this movement is prevented by the one-way clutch 202 and the result is that the sun gear 194 stays stationary and the planetary gear 192 rolls around it carrying with it the rotary casing 186 to thereby rotate the driven shaft 158 in the direction shown by the arrow.

It should be explained here that in the commercial embodiment of the apparatus of the invention as hereinafter explained in conjunction with the remaining figures of the drawings that a plurality of rocker arms 174, shafts 180, planetary gears 192, and so forth, will be placed circumferentially around crank arm 166 whereby the intermittent rotary motion given the driven shaft 158 by but a single rocker arm 174 is converted to a continuous rotary motion to the driven shaft as the plurality of rocker arms effectively operate in turn, this overlapping action being schematically shown in FIG. 4 of the drawings.

It will be understood, also, that as the throttle is initially opened with a vehicle at dead stop the mechanical advantage provided by the mechanism will be at a maximum and a large starting torque will be transmitted to driven shaft 158. But as the vehicle begins to come up to speed and the torque requirements on driven shaft 158 are reduced the mechanical advantage of the mechanism is reduced until such time as the transmission reaches a 1 to 1 drive between the driving shaft and the driven shaft. At this time the crank arm 166 is at its most outward position, the rocker arm may engage with the rotary casing 186 as described in conjunction with the remaining figures of the drawings, rotary motion between the planetary gear 192 and the sun gear 194 ceases, with rocker arm 174, shaft 180, rotary casing 186, planetary gear 192 and sun gear 194 all turning as a unit with the driven shaft 158, the overrunning clutch 202 allowing the sun gear to turn.

Coming back once again to the condition of the mechanism with the engine turning the driving shaft 150 at a slow or idling speed it may be desirable, and usually is, to have a gear shift lever movable from operative to neutral position. With the gear shift lever in operative position, or "drive" the operation is as heretofore described. However, an operator often wishes to place a transmission in a neutral condition so that in starting an engine the engine can be revved up, as in warming up, without any movement of the vehicle. With the transmission of the present invention a control lever 210 to place the transmission in neutral will simply release clutch 202. Inasmuch as such means are known the details of the release have not been illustrated. This will keep the sun gear from locking against rotary motion in the direction shown by the arrow, so that the sun gear 194 will be rotated by planetary gear 192 instead of having the rotary casing 186 rotated, and the driven shaft 158 will not move with the lever 210 in "neutral" position.

Considering now the operation of the transmission when the driven shaft 158 drives back through the mechanism to the driving shaft 150, for example when a motor vehicle is going down hill and no gasoline is being fed to the engine. At this time a 1 to 1 drive is established between the driven shaft 158 and the driving shaft 150 by means of the clutch 204. More specifically, the driven shaft 158 will turn the rotary casing 186 which through hollow trunnion 190 causes the clutch 204 to pick up the driving shaft 150 and carry it with the rotary casing. In order to establish a free wheel condition clutch 204 must be held against engagement and a control lever 212 may be provided for this purpose using known mechanism for clutch release.

Clutch 206 is simply a slip-back preventer so that when a motor vehicle including the automatic transmission of the invention comes up to a stop light half-way up a hill and the vehicle attempts to slide back down the hill as the engine throttle is closed, with the driven shaft 158 tending to turn in the direction opposite to the arrow shown in association therewith rotary casing 186 and hollow trunnion 190 attempt to turn in the same direction which will cause the clutch 206 held by the fixed casing 156 to operate and prevent such slip-back movement.

It will be noted that no reversing mechanism has been shown in association with the transmission, but it will be recognized by those skilled in the art that this can be achieved in various ways, for example, by a standard reversing mechanism.

A typical commercial embodiment of the invention, illustrated in FIGS. 1 to 21, comprises a fixed housing $C_F$, FIGS. 1, 2 and 3, supporting the whole device. Said fixed housing $C_F$ consisting of the central element 10, on the front face the fore end plate 11 on which is fixed the fore hub 13; on the rear face, the aft end plate 12 and fixed on the aft hub 14. Inside said fixed housing $C_F$ is coaxially mounted a rotating casing $C_R$ consisting of the cylindrical body 20 with, on the front face the fore end plate 21, the drum $21_3$ and the hub 23; on the rear face the aft end plate 22 and the shaft 24 integral with same, which is the driven member $D_N$ of the unit. The fore hub 23 is free to rotate inside the corresponding fore hub 13 of said fixed housing $C_F$, by means of the bearings $13_1$ while the aft shaft 24 is free to rotate inside the aft hub 14 of said fixed housing by means of the bearings $14_1$. The driving shaft 30 is mounted free to rotate, by means of the bearings $23_1$, in the fore hub 23 of the rotating casing $C_R$ and transmits inside the nominal motion i.e. the motion received from the external source of power. All the components above described: fixed housing, rotating casing, driving shaft and driven shaft are coaxially mounted, and rotate about the central rotational axis $X_0X_0$. Between the drum $13_2$ of the fore hub 13 of the fixed housing $C_F$ and the drum $21_3$ of the fore end plate 21 of the rotating casing $C_R$, an automatic one-way brake $B_S$, FIGS. 1 and 3, consisting of a clutch-band 15 is provided which acts, as will hereinafter appear, to prevent rotation of the rotating casing $C_R$ in a direction opposite to the rotation of the driving member $D_G$, or backward direction, but which freely permits rotation in the same direction as the rotation of said driving member $D_G$, or forward direction.

The converting mechanism is located inside the rotating casing $C_R$. This mechanism receives the nominal motion from the driving shaft 30 by means of the circular crank arm 31, integral with same, and provided with a crank-pin bearing 32, FIG. 10, bored at a definite distance $r_N$, FIG. 7, from the central rotational axis $X_0X_0$. The head pin $74_1$, of a primary connecting rod 74 having the shape of a single-throw crank shaft, FIG. 10 is mounted free to oscillate inside the above crank pin bearing 32 of the driving crank arm 31 and, therefore, is carried along by same at the tangential nominal velocity while the tail pin $74_2$ of said primary connecting rod 74, has a variable tangential velocity which varies as a direct function of the distance $r_X$, FIGS. 1, 7, 8, of its geometrical axis $X_{74_2}X_{74_2}$ from the central rotational axis $X_0X_0$. The magnitude of the radius of the primary connecting rod 74, which is defined as the distance extended from the geometrical axis $X_{74_1}X_{74_1}$ of its head pin $74_1$ to the geometrical axis $X_{74_2}X_{74_2}$ of its tail pin $74_2$, has no limitation, but a preferred magnitude is one that is equal to the nominal radius $r_N$ of the crank pin bearing 32, because this particular value enables the axis $X_{74_1}X_{74_1}$ of the tail pin 74 to come in coincidence with the central rotational axis $X_0X_0$ and, in doing so, to achieve a neutral position whereby the said distance $r_X$, which generates the amplitude of the transmitted motion, vanishes while at the same time and although the driving member continues to rotate, the transmitted motion diminishes to zero. Said nominal radius $r_N$ of the crank pin bearing 32 is defined as the distance extended from its geometrical axis $X_{32}X_{32}$ to the common central rotational axis $X_0X_0$. The circular crank arm 31 of the driving member $D_G$ is provided with a guide $31_2$ in the form of a circular arc, FIGS. 1, 3, 10 and 12, rigidly mounted on its rear face, which maintains in the correct position the corresponding oscillating base $74_3$ of the primary connecting rod 74 which is provided with a corresponding circular groove $74_3$, in order to prevent the distortion which could result from the bending moment generated on its tail pin $74_2$ by the reaction of the converted driving force $F_C$, transmitted by the heads $75_1$ of a series of secondary connecting rods 75 which are mounted free to rotate on the tail pin $74_2$ and compelled therefore to follow its trajectory while each tail $75_2$ of said secondary connecting rods 75 are separately connected with the head $45_1$ of the arm 45 of a corresponding series of selective receiving devices $S_R$, which are distributed circularly and whose longitudinal axes are spaced at equal intervals inside the rotating casing $C_R$ and mounted free to rotate by means of the bearings $21_1$ and $22_1$, and ball bearings $21_2$ and $22_2$ mounted respectively on the fore end plate 21 and the aft end plate 22 of the rotating casing $C_R$.

The moment $M_1$, relative to the central rotational axis $X_0X_0$ of the center of gravity $g_1$ of the oscillating components, i.e.: the primary connecting rod $P_{CR}$ and the part of the masses applied on the tail pin $74_2$ of same by the series of the secondary connecting rods 75, is balanced by the moment $M_2=-M_1$ obtained from an appropriate system of counterweights 76, $74_5$ and $76_3$ shown in FIGS. 10, 11 and 12, whose synchronized and opposite angular displacement of the center of gravity $g_2$ maintains permanently located on said rotational axis $X_0X_0$ their resulting center of gravity $G_0$. The counterweight 76 is diametrically opposed and similarly disposed, on the aft face of the driving crank arm 31, as the primary connecting rod $P_{CR}$; its head pin $76_1$ is mounted free to oscillate in the crank pin bearing 33. On the fore ends $74_4$ and $76_4$ of the head pins 74 and 76 of the primary connecting rod and the counterweight 76 located on the fore face of said crank arm 31, are mounted the elements of the synchronizing device which comprise any appropriate complementary counterweights or compensating members $74_5$ and $76_3$, whose toothed bases $74_6$ and $76_4$ are meshing with a sun gear 77 mounted capable of oscillating around the driving shaft 30, and provided with a spring circularly guided and compressed between said driving shaft 30 and sun gear 77 such a manner that the resulting tangential force transmitted by its ends has for the effect of maintaining the tail pin $74_1$ of the primary connecting rod $P_{CR}$ in the neutral position when the driving shaft 30 is at rest or rotating under a low predetermined rotational speed, FIGS. 10 and 13.

The tail pin $74_2$ of the primary connecting rod $P_{CR}$ transmits, through the secondary connecting rods 75, to the arms 45 and to the tubular shaft 40 integral with same, an oscillating motion whose amplitude is a direct function of the magnitude of the distance $r_X$ described above, while the corresponding variable force applied on the heads $45_1$ of said arms 45 of the selective receiving devices determines the "converted driving force $F_C$", FIG. 7, whose intensity is a reverse function of same while depending on its magnitude at every instant of time t; thus the variable, geometrical and immaterial distance $r_X$ is, in fact, the "instantaneous equivalent converting radius" of this converting mechanism; but it is a "dependent variable" whose magnitude depends upon the equilibrium conditions of the two opposed systems of forces applied on the tail pin $74_2$ of the primary connecting rod 74 i.e.: The converted driving force $F_C$ which is opposed to the resisting force $F_R$, FIG. 7, the resulting centrifugal force $F_{CF}$ applied on the rotating components of the converting transmitting mechanism, which is opposed to the centripetal component $F_{CP}$ of the nominal tangential driving force $F_C$. As will hereinafter be established said instantaneous equivalent converting radius $r_X$ increases with either the relative increase of the nominal tangential driving force $F_{TN}$ or the relative decrease of the resisting force $F_R$, and decreases with either the relative decrease of the nominal tangential driving force $F_{TN}$ or the relative increase of the resisting force $F_R$, in order to permanently satisfy the conditions: $T_N = F_R \cdot r_X$ between the nominal torque $T_N$, the resisting force $F_R$ and said instantaneous equivalent converting radius $r_X$.

As it is shown in FIGS. 2, 7 to 10 and 19, the primary connecting crank rod 74 constitutes at the point B and with each one of said secondary connecting rod 75, an "articulated connecting rod" 74–75, whose configuration varies as a function of the angle $\varphi = \delta + \Omega$, equal to the sum of the rotational motion corresponding to the variation of the angle $\delta = f(\varphi)$ and the radial, or oscillating motion corresponding to the variation of the angle $\Omega$.

In operation, the articulation B of the articulated connecting rod 74—75 is permanently maintained in state of equilibrium, as shown in FIG. 7, under the double and variable action of the tangential and radial systems of opposed forces, which respectively comprise:

The tangential converted driving force $F_C$ and the tangential resisting force: $F_R = -F_C$.

The centrifugal force $F_{CF} = m\omega^2 r_X$, generated by the rotational speed $V = r_X \omega_n$ which is applied on the mass $m$ of the rotating parts carried by said articulation B; and the centripetal force $F_{CP}$, or radial component of the nominal tangential driving force $F_N$ which generates the motion.

Since the motion of the converting element 74 is composed of the adidtion of rotation and oscillation, it is justified to refer the analysis of the converting oscillating motion of the articulation B to a system of axis rotating at the same angular speed as the driving member $D_G$. Under this condition and from steady state operation for which the angle $\Omega$=constant, and the articulation B rotates at a constant distance: $r_X$=constant, from the central rotational axis $X_0X_0$, as shown in FIG. 7; some increase $\Delta F_R$, of the tangential resisting force $F_R$ which disrupts the initial steady state of equilibrium has for an effect to start in operation the converting mechanism whose converting process is then achieved as follows:

The new resistance $F_{R_2} = F_{R_1} + \Delta F_{R_1}$ applied on the head $45_1$ of the selective receiver member $S_R$, which disrupts the initial steady state of equilibrium gives, in turn, a supporting point to the tail $75_2$ of the articulated connecting rod $C_R$, and in doing so, enables the tangential nominal force $F_N$ of the driving crank arm 31 to directly operate against the centrifugal force $F_{CF}$, by means of its centripetal component $F_{CP}$.

But the magnitude of said centripetal component $F_{CP}$ increases with the angle $\Omega$ and, consequently compels the articulation B to move towards the central rotational axis $X_0X_0$, in a centripetal motion whose effect tends to align the two semi-elements 74 and 75 of said articulated connecting rod $C_R$ while simultaneously decreasing the distance $r_X$ which has the property to be both at the same time, the driving torque radius and the resisting torque radius, that which results in the achievement of the double following conversion:

(A) The increase of the magnitude of the tangential converted driving force $F_C$ which tends to infinity when the angle $\varphi$ approaches the value $\pi/2$.

(B) The decrease of the magnitude of the "Relative Resisting Torque Radius" $r_X$ which tends to become equal to zero when the angle $\varphi$ approaches the value $\pi/2$ and in doing so, to eliminate the consideration of the opposite driving and resisting torques which will be no longer considered and replaced by the simpler system of the opposed driving and resisting forces $F_C$ and $F_R$.

This elementary analysis shows that:

While the increase of the rotational motion of the driving member 31 has for the effect of increasing the magnitude of the tangential converted driving force $F_C$, and, in doing so to enable it to get the magnitude required to equilibrate the new tangential resisting force $F_{R_2}$, the decrement $\Delta r_X$ of said relative resisting torque radius $r_X$, from the initial value $r_{X_1}$ to the final value $r_{X_2} = r_{X_1} - \Delta r_{X_1}$, has for a first effect to directly decrease the magnitude of the centrifugal force $F_{CF}$, thus the articulation B is simultaneously subjected in the radial direction to an increasing centripetal driving force $F_{CP}$, and to an opposed decreasing centrifugal force $F_{CF}$; the consequence of such a condition seems at first sight that said articulation B must be directly driven on the central rotational axis $X_0X_0$, position which corresponds to the disengaged condition. But, at the very same time the decrement $\Delta r_{X_1}$ of the relative resisting torque radius $r_{X_1}$ has for a second effect to generate a corresponding decrement of the resisting torque since: $T_R = F_R \times r_X$, FIG. 7, that which results in a release of the engine whose rate of rotation instantaneously increases and, with it, the centrifugal force $F_{CF}$ as the square power of the rotation, that which enables it to rapidly resist to the thrust of the centripetal force $F_{CP}$, such a manner that a new steady state of equilibrium can be obtained with the new values of the variables, as follows:

$$F_{C_2} = F_N/2 \, \cos \Omega_2 = -F_{R_2} \quad (1)$$
$$F_{CP_2} = F_N \sin \Omega = -F_{CF_2} = -m(\omega + \Delta\omega)^2(r_{X_1} - \Delta r_{X_1}) \quad (2)$$

The selective receiving devices are composed of a driving member (the oscillating tubular driving shaft 40) and a driven member (the internal shaft 50 which is free to rotate inside same). Both of these shafts are connected by an automatic one-way clutch, which is spiral shaped and mounted between the above described driving and driven members, and whose one end is attached to the driven member 50 while the second end is free relatively to said driven member 50. The clutch band 60, FIGS. 1, 3, 20, is wound in a backward spiral or backward rotational direction, with a certain clearance around the driven shaft 50; the coil is loaded by an initial resistance to expansion from the inner cylindrical wall $40_W$ of said oscillating tubular driving shaft 40, which is obtained by the change of configuration underwent from its initial conical shape envelope under natural free molecular state equilibrium, as shown in FIGS. 22, 23 and 24 to its constrained final cylindrical shape envelope after introduction inside the oscillating tubular driving shaft 40, as shown in FIGS. 1, 3, 20 and 27.

FIG. 21 illustrates the corresponding static pressure distribution applied by the spires of the coil on the internal cylindrical wall $40_W$ of the driving shaft 40. As the result of this disposition, during the part of the oscillating motion in backward rotation, the inner cylindrical wall $40_W$ freely slides on the coils of the spiral clutch band while during the oscillating motion in forward rotation, the inner cylindrical wall $40_W$ tries to unwind the spires and, in doing so, generates on same the inducing tangential force which enables the internal shaft 50 to be carried along by developing on the fastening $60_0$ of the band 60, the required induced force $F_D$ which must be equal to the converted driving force $F_C$, whose variation as a function of the initial static pressure distribution and the number of the spires of the coil are also illustrated on FIG. 21.

In this way, the band 60 is subjected to a pure compressive force, and its fastening $60_0$ which consists of a loop inserted inside a corresponding mortise, acting as a circular guide, in the driven shaft 50, does not submit this subjected end of the band to any secondary kind of stress. Another feature of the selective receiving device is the specific shape of the free end of the coil, which forms a finger $60_3$ whose end $60_4$ is permanently under pressure, due to the bending moment imposed to the free ending spire of that coil, on the appropriate circular wall $40_3$ of a collar $40_4$ integral with the tubular driving shaft 40 while the angle $\epsilon_2$ formed by the axis $X_F X_F$ of said finger $60_3$ with the direction $N_C N_C$ normal to said circular wall $40_3$ at the contacting point $C_T$ is inscribed within the wedging cone, whose semi-apex angle $\eta_0$ is a specific characteristic of the frictional surfaces. The direction of the opening of the wedging semi-apex angle $\epsilon_2$ depends upon the oscillating motion in backward rotation where the end $60_4$ of said finger $60_3$ slides freely on the circular wall $40_3$ while during the oscillating motion in forward rotation said circular wall $40_3$ wedges the end $60_4$ of the finger $60_3$ which, in turn, reacts on same as an "arch-buttress" and transmits to the coils an inducing compressive force $t_1$ which, by means of this device, is proportional to the tangential resisting force $F_R$, as well as the resulting tangential induced force $F_D$ which carries along the internal driven shaft 50, as being applied to the fastening $60_0$ of the clutch band 60 on same. The induced force $F_D$, which is related to the inducing force $t_i$ by the equation:

$$F_D = t_i \cdot e^{2\pi n c f} \ldots (\quad)$$

can be rewritten, under these new conditions, as follows:

$$F_D = -F_R \cdot e^{2\pi n c f} = F_C \cdot e^{2\pi n c f} \ldots (\quad)$$

By the trend of the above process a value, which should be equal to ($e^{2\pi n c F}$) times higher than the required induced force $F_D$ can be obtained; this result demonstrates that any slippage of the coil on its operating internal cylindrical wall $40_W$, is absolutely impossible.

Another feature of the selective receiving devices consists in the specific means to prevent any backward displacement of the coil relatively to its attached shaft 50, eventually generated by the unlock of the coil from the wedging internal cylindrical wall $40_W$ at the origin of the backward rotation of the oscillating tubular driving shaft 40, and which could result in a time-lag response at the next forward rotation of same. To prevent such a time-lag response, some appropriate devices are designed as shown in FIG. 20 for limiting at the required theoretical infinitesimal value, practically equal to zero, the amplitude of the backward relative angular displacement of the coil which is required for unwedging same from the internal wedging cylindrical wall of the oscillating tubular driving shaft 40. The first device shown in FIG. 25 comprises the abutment A, mounted integral with the shaft attached to the coil 60, and disposed in such a manner that its upper side $aa$ remains located at the allowed distance $c$ from the lower side $gg$ of the finger $60_4$ of the ending spire of the coil considered in operation. The second device consists of the same as described above in which said abutment A comprises a resilient material inserted between its upper face and the lower face of the finger $60_4$ of the ending spire to maintain between them an appropriate distance which is a function of the resistance opposed by the resilient means to the backward rotation of the coil. The third device, given as an example of the application of the process, consists to enclose the driven shaft 50 of the selective receiving devices inside a tube which is made of a resilient material. The clutch band 60 is wound without clearance around the resilient tube and its external diameter is slightly higher than that of the internal cylindrical wall $40_W$ of the oscillating tubular driving shaft 40. When mounted inside same, said resilient tube maintains permanent pressure between the outside faces of the coil and the internal wall $40_W$ of the driving member for generating between the inside faces of the coil and said resilient tube a tangential resistance, to the angular motion, higher than that generated by the wedging wall on the coils. In doing so the practical minimum value is obtained, corresponding to the theoretical infinitesimal value of the backward angular displacement of the coil, relative to its attached shaft 50, required for unwedging the coil from the internal cylindrical wall $40_W$, during the backward rotation of the oscillating tubular driving shaft 40.

The pressure transmitted from said resilient tube for applying permanently the coil on the internal cylindrical wall $40_W$ is low so that during the backward rotation of the oscillating tubular driving shaft 40 the behavior of the outside face of the coil on the inside face of said internal wall $40_W$ is similar to that of the journal of an unloaded shaft-journal rotating in its bearing. The pressure transmitted from said resilient tube for applying permanently the coil on the internal cylindrical wall $40_W$ can be either constant or variable in the axial direction as depending upon the either constant or variable thickness of the profile of said resilient tube, moreover said variable pressure can be increasing or decreasing in said axial direction; therefore by means of an appropriate profile, said resilient tube is able to satisfy, at the same time, to the generation along the spires of the coil of any convenient law of the tangential inducing force distribution $t_i = f(x)$, similar to those obtained from the constrained coils, shown in FIG. 21, and described above. The resilient-tube process can be applied in any case, for any purpose, alone or in combination with all other devices adaptable to it. FIG. 20 represents a part of a selective receiving member improved by means of such a combination of the devices described above and which can therefore operate as well as without any slippage and time-lag response to the transmission of the selected motion while the magnitude of the induced tangential force $F_D$ which, as a result is transmitted with an efficiency close to unity, has not any practical limitation because this mechanical device can be built without any scale limitation.

Another feature of the selective receiving devices consists in that several band-like gripping members can be attached at once on the same shaft and mounted in interlaced relation around same while their corresponding anchoring points are regularly distributed at equal angular intervals around it as shown, developed in a plane for a better presentation, in FIG. 25. The number of automatic clutch bands which can be mounted is theoretically determined by the corresponding optimum value of the ratio: $I/D$, relating the moment of inertia $I$ of the cross section of the band to the diameter $D$ of the spire of the coil for an efficient value of the corresponding pitching angle $\alpha$ common to all the spires of the different coils interlaced. In FIG. 25 is shown in the same way the arrangement of the semi-free ends of the corresponding coils set to work. Moreover, all the ending elements of the coils can be connected all together by means of a ring which is either directly applied on the wedging circular wall $40_3$ of the oscillating tubular driving shaft 40, or by means of a disc made of some brake lining material, mounted integral with either the ring or the wedging circular wall $40_W$ of the collar $40_3$ of the oscillating tubular driving shaft 40 for synchronizing the wedging action of said ending elements of the different coils operating and generating in this way under the best conditions the inducing force $t_1$ of the automatic clutch control.

The number of the selective receiving devices which can be set to work on a converter is only limited by some practical considerations and was made arbitrarily equal to six in the present example by means of the specific arrangement of an auxiliary component which will be described later. Under this condition each one of the six corresponding oscillating tubular driving shaft 40 alternately carries along the rotating casing $C_R$ and correlatively the main driven shaft 24 integral with same, within an angular range equal to one sixth of the variable total angular displacement transmitted to it by the converting mechanism at every single turn of the driving member $D_G$. Therefore the control of the driving operation passes from one selective receiving member to the next one at the exact instant of time "$t$" for which the decreasing rotational speed of the tubular driving shaft 40 of one component becomes equal to the increasing rotational speed of the tubular driving shaft of the following component, and so forth, every one succeeding each other in the same manner as the teeth of two meshing wheels of a gear, i.e. under the best mechanical conditions when considering the corresponding cyclic variation of the intensity of the converted torque transmitted to the main driven shaft 24 of the converter through the series of the six selective receiving components constituted and distributed as described above for which the cyclic regularity computed from the curves shown in FIG. 4, is identical to that of a twelve cylinder reciprocating engine.

On the aft end of the internal driven shaft 50 of the selective receiving components, which is extended outside the aft bearing plate 22 of the rotating casing $C_R$, is rigidly mounted a planetary gear 51 which meshes with a sun gear 80 mounted, by means of its bearing 80 and the needle bearing $14_2$, on the internal hub $14_2$ of the fixed housing $C_F$ while connected with same by means of the automatic one-way brake $B_S$ which is composed of the drum 16 integral with the internal face of the aft end plate 12 of the fixed housing $C_F$, the automatic brake band $80_2$ attached on the drum 16 and wound around in the appropriate direction which freely permits forward rotation of said sun gear 80 while preventing backward rotation of same in wedging then the internal cylindrical face of said sun gear 80, and in doing so, giving to the planetary gears 51 the fixed support required from said selective receiving components $S_R$ for generating on their own shaft bearings $21_1$ and $22_1$, the tangential converted reacting driving force $F_T$ applied at the end of the lever arm $r_{RS}$ equal to the radius of the circle joining altogether the axis of the series of the selective receiving component in the transversal plane, for transmitting the power to the rotating casing planet carrier $C_R$ and to the driven shaft 24 integral with same.

The specific arrangement described heretofore, and which allows the use of an optimum number of selective receiving devices consists in the fact that the ends of the internal driven shafts, which extend outside the aft end plate of the rotating casing $C_R$, are alternately located in two different transversal planes allowing in this way, the use of an appropriate number of said selective receiving devices by overlapping the planetary gears 51 which are rigidly attached to the ends of said driven shafts 50, as shown in FIG. 2; the diameter of these gears which meshes with the sun gear 80 are too large limiting the number in one plane, thus two or more planes can be required while the length of the sun gear is adapted to the corresponding condition.

Thus, the mechanism of the converter is adapted to transmit the power from the driving $D_G$ to the driven member $D_N$, within an infinite range of reducing speed ratio which is completely independent of the gear ratio of the epicyclic-gearing described above and whose function is just limited to give a fixed support to the converting mechanism.

The converter can be provided with a self-locking device which automatically operates the establishment of the direct connection between the driving and driven members $D_G$ and $D_N$ as soon as the amplitude $\theta$, of the converted-oscillating motion reaches a predetermined maximum value. As explained above, the amplitude $\theta$ is a direct function of the magnitude of the instantaneous equivalent converting radius $r_X$ for which any limitation has to be imposed, but in the present example the converter herein described, the maximum magnitude at which said equivalent radius $r_X$ has to operate is slightly higher than that $r_N$ of the crank pin bearing 32, FIG. 7 of the driving crank arm 31. As illustrated in FIG. 19 a series of abutments $100_{A_1}, 100_{A_2}, \ldots 100_{A_6}$, whose number is equal to that of the number of the selective receiving devices, are longitudinally distributed inside the cylindrical body 20 of the rotating casing $C_R$, such a manner that when the length of said equivalent radius $r_X$ exceeds the length of the radius $r_N$ the articulation C, FIGS. 7 and 19, of the secondary connecting rods 75 with the arms 45 of the selective receiving devices, directly apply on said abutments $100_{A_1}$ or others, the force transmitted through the secondary connecting rod 75 and, in doing so, to perform a self-locking operation of the mechanical components, which results in the transmission $i$ in direct drive of the nominal motion from the driving member $D_G$ to the driven member $D_N$.

To achieve with an imperceptible manner said self-locking operation, the dimension ratio of all the components implied in the mechanical link of the converting mechanism are provided with such adequate values that the product of their corresponding partial velocity-ratio, whose product determines the final velocity-ratio between the driving and driven members be equal to unity when the amplitude of the oscillating converted motion reaches its maximum value. This effects with an absolutely imperceptible manner said self-locking of its components because under this condition it is achieved at the very same instant that the driving and driven members are rotating at the same angular velocity.

In order to make possible the use of the engine as a brake, for a vehicle, when the operation between these two units becomes reversed, the driving and driven members $D_G$ and $D_N$, FIG. 3, are connected by means of an automatic one-way clutch $B_{DN}$, which permits free forward rotation of the driving member $D_G$ but prevents the driven member $D_N$ to rotate faster than said driving member $D_G$. The automatic clutch can be advantageously constituted of a clutch band 25 attached on the driven member $D_N$ and wound around it in a backward direction of rotation; the external face of this band 25 is resisted by the interval cylindrical wedging wall $23_W$ of the fore hub 23 of the rotating casing $C_R$. This clutch is constructed and operates similar by the above described selective receiving devices but, moreover, it is possible to disengage the band 25 by means of a control lever and, in doing so, to achieve free forward rotation of said driven member even though the driving member is at rest.

As illustrated in FIG. 3, a "parking brake" is provided, which comprises one part of the automatic one-way brake $B_C$ of the converting mechanism and prevents backward rotation of the driven member $D_N$. This automatic brake $B_C$ is able to restrain the vehicle from moving when located in an up-hill position. The second part of said parking brake consists of another one-way brake $B_P$ which is controlled by a lever and prevents forward rotation of the driven member $D_N$. The one-way brake $B_P$ is composed of a clutch band 160 that has one end attached directly to the aft end plate 12 of the fixed housing $C_F$ by means of the articulating end of the band 161 on the axis $12_2$ of the fixed housing $C_F$, but the opposite end is attached on the tail end of a lever 163 whose head 162 is mounted in a position enabling it to rotate about an axis which is also integral with the aft end plate of the fixed housing $C_F$. The position of the tail of said lever 163 can be located at position A or B for the purpose of tightening or releasing the said band 160 on the drum $24_1$ which is fastened to the driven member 24.

FIGS. 32 to 34 illustrate a converter wherein the chain of the transmission of motion between the driving and driven shafts is similar to that as described above while the converting mechanism corresponds to a principle consisting in the use of the value infinity which is periodically reached, as in the preceding case, by the force transmitted to the linearly oscillating end of a rod whose second end is subjected to a nominal tangential driving force $F_N$, of constant or variable magnitude, describing a circular motion, for storing the energy transmitted by said driving force in the range in which said driving force is higher than the opposed resisting force $F_R$, and restoring in adding such an energy to said nominal driving force, in the angular complementary range in which said nominal tangential driving force is lower than that of the resisting force $F_R$. In FIG. 32 is shown a diagrammatic composition of a driving member comprising the crank shaft 30, crank arm 31 and crank pin 32 on which is free to rotate the head $74_1$ of the connecting rod 74 whose tail $74_2$ is mounted free to oscillate on the head $45_1$ of the lever arm 45 of a rocker member 40. In this device the radius of the crank arm 31 keeps a constant value and the converted driving force $F_N$ which acts in the direction of the connecting rod 74 and whose range of magnitude is extended between the minimum value which is equal to $F_N$, and infinity which is reached when the angles: $\pi-\theta$ and $\epsilon$, formed respectively with the axis $Z_0Z_0$ by the direction of the crank arm 31 and the connecting rod 74 are equal to zero, since this component can be expressed by the relation:

$$F_C = F_N/\sin \alpha = F_N/\sin\left[\frac{\pi}{2} - (\theta+\epsilon)\right] = F_N/\cos(\theta+\epsilon)$$
$$= F_N/\cos\theta\cos\epsilon - \sin\theta\sin\epsilon = \infty$$

when:

$$\theta = \frac{\pi}{2} \text{ and } \epsilon = 0$$

To use the variation of said converted force $F_C$ in the two directions the mechanism illustrated in FIGS. 33 and 34 is equipped with two rocker members located in positions diametrically opposed with respect to the longitudinal central rotational axis $X_0X_0$, said rocker members being composed in an identical manner as the selective receiving devices described above, each one of them transmitting the converted motion to a planetary gear 51 integral with same, meshing with a sun gear 80 mounted by means of a one-way brake 90 on the fixed housing 10 and is prevented against backward rotational direction while free to rotate in forward direction. To allow to the converted driving force $F_C$ the continuity of the rotational motion in the angular range where the magnitude of the resisting force is higher than its own, between the connecting rod 75, FIGS. 33 and 34, and the lever arm 45 of the receiving selective devices is inserted a flying wheel 46. The crank pin $75_3$ transmits its oscillating motion to the lever arm 45 which has an internal circular toothed base $45_3$ meshing with the gear pinion $40_1$ integral with the internal tubular driving shaft 40. The lever arm 45 is free to oscillate around the axis $45_{10}$ carried by the flying wheel 46 while same is mounted to freely rotate around the oscillating tubular driving shaft 40.

As the result of this combination, when the resisting force opposed to the rotation of the driving shaft 40 is higher than the driving converted force $F_C$ the lever arm 45 and the flying wheel 46 rotate both around the driving shaft 40 at low rotational speed, but the increase of the rotational speed has for an effect of storing the excess of energy provided in the flying wheel during a part of the rotation, and for second effect of restoring same during the second part of the rotation. The device comprises a double throw crank shaft and a double pair of converting members, moreover all the flying wheels are meshing with each other by means of a toothed base $46_1$ and are maintained in neutral position by means of a system of springs 200 which are equilibrated in this neutral position in two opposed directions. The device is in this way, statically and dynamically balanced. The transmission of the nominal motion in direct drive is achieved when the centrifugal force acting on the converting mechanism maintain the two pairs of connecting members 45 in upper position.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in a torque and speed responsive variable speed transmission having a fixed casing, a rotary casing journalled on hollow trunnions for rotary movement in the fixed casing, a driven shaft in alignment with the axis of the rotary casing and extending in journalled relation through the hollow trunnion at one end of the fixed casing and operatively connected to the rotary casing for rotary movement therewith, a driving shaft in alignment with the axis of the rotary casing and extending in journalled relation from outside the fixed casing through the hollow trunnion at the other end of the fixed casing and into the inside of the rotary casing, a member secured to the driving shaft inside the rotary casing, a crank arm pivotally secured to the member on an axis parallel to the driving shaft but offset radially therefrom, said crank arm swinging outwardly under the action of centrifugal force as the speed of the driving shaft is increased, resilient means resisting the outward swinging movement of the crank arm, a crank pin secured to the outer end of the crank arm parallel to the axis of the driving shaft, rocker arm means mounted inside the rotary casing for oscillating movement substantially in the plane of the crank arm, connecting rod means pivotally connecting the crank pin of the crank arm with the rocker arm means whereby rotary movement of the crank arm effects oscillating movement of the rocker arm means, shaft means journalled in the rotary casing parallel to but radially offset from the axis of rotation thereof, one-way clutch means mounting the rocker arm means on the shaft means, a gear around the driven shaft between the fixed casing and the rotary casing, a releasable clutch on the fixed casing normally holding the first-named gear against backward rotary movement, and planetary gear means on the shaft means and engaging with the first named gear.

2. The combination defined in claim 1 wherein means on the member are provided for counterbalancing the crank arm regardless of its position.

3. The combination defined in claim 1 wherein a releasable one-way clutch is provided between the rotary casing and the driving shaft.

4. The combination defined in claim 1 wherein a releasable one-way clutch is provided between the rotary casing and the fixed casing.

5. The combination defined in claim 1 wherein at slow or idling speed of the driving shaft the crank pin of the crank arm lies coincident with the axis of the driving shaft.

6. The combination in a torque and speed responsive variable speed transmission of a driving shaft, a member operative connected to and rotated by the driving shaft, a crank arm pivotally secured to the member on an axis parallel to the driving shaft but offset radially therefrom, said crank arm swinging outwardly under the action of centrifugal force as the speed of the driving shaft is increased, resilient means resisting the outward swinging movement of the crank arm, a crank pin secured to the outer end of the crank arm parallel to the axis of the driving shaft, a rocker arm mounted for oscillating movement substantially in the plane of the crank arm, a connecting rod means pivotally connecting the crank arm and the rocker arm whereby rotary movement of the crank arm effects oscillating movement of the rocker arm, a planetary shaft, a one-way clutch securing the rocker arm to the planetary shaft, a planetary gear secured to the planetary shaft, a rotary casing, a driven shaft operative connected to the rotary casing, the planetary shaft being journalled in the rotary casing in a position so that its axis is parallel to but radially offset from the axis of the driven shaft, a gear having its axis coincident with the axis of the driven shaft and with the second-named and planetary gears engaging, and a releasable clutch normally holding the second named gear against backward rotary movement.

7. The combination defined in claim 1 wherein the parts are so proportioned that as the speed of the driven shaft comes up to the speed of the driving shaft the rocker arm means come into non-jarring engagement with the rotary casing to effect direct 1 to 1 drive between the driving and driven shafts.

8. In combination in a variable speed transmission, a driving shaft, a crank arm pivotally carried by the driving shaft and adapted to be thrown by centrifugal force to increase the effective radius of the crank arm, a plurality of rocker arms spaced circumferentially around the crank arm, a plurality of connecting rod means connecting the crank arm to the rocker arms to effect oscillating movement of the rocker arms upon rotary motion of the crank arm, means for converting the oscillating movement of the rocker arms to periodic one-way rotary motion, a driven shaft, and means connecting in overlapping relation the periodic one-way rotary motion to the driven shaft to effect a continuous one-way rotation thereof.

9. The combination defined in claim 8 wherein the effective radius of the crank arm is determined in part by the speed of rotation of the driving shaft and in part by the load on the driven shaft transmitted back to the crank arm through the rocker arms.

10. The combination defined in claim 8 wherein means are provided to counterbalance the crank arm regardless of its effective radius.

References Cited in the file of this patent

UNITED STATES PATENTS

| 2,047,792 | McFarlane | July 14, 1936 |
| 2,816,458 | Castrow | Dec. 17, 1957 |
| 2,826,097 | Panciroli | Mar. 11, 1958 |